Nov. 3, 1959   S. C. ROCKAFELLOW   2,911,581
THREE PHASE TO SINGLE PHASE WELDING METHOD AND MACHINE
Filed Sept. 19, 1956   2 Sheets-Sheet 1

INVENTOR.
STUART C. ROCKAFELLOW
BY
Woodhams Blanchard & Flynn
ATTORNEYS

United States Patent Office 2,911,581
Patented Nov. 3, 1959

2,911,581

THREE PHASE TO SINGLE PHASE WELDING METHOD AND MACHINE

Stuart C. Rockafellow, Plymouth, Mich., assignor to Robotron Corporation, Detroit, Mich., a corporation of Michigan Application September 19, 1956, Serial No. 610,804

7 Claims. (Cl. 321—7)

This invention relates to a process and apparatus for effecting a conversion of a poly-phase, high frequency, power supply to a single phase, low frequency, power output and, more particularly, relates to an improved process and apparatus for frequency conversion of a commercial, three phase, 60-cycle, alternating current, power supply and supplying same to the welding transformer of an electric, resistance welding machine.

The practice of transferring energy from a single phase of a polyphase, e.g., three phase, supply circuit to a load circuit at the same frequency has been widely adopted in the resistance welding field. However, single phase loading of a three phase power supply creates an appreciable, and sometimes severe, unbalance in the supply circuit, particularly where the single phase loading occurs intermittently, as is the case with the usual resistance welding operations. This problem is well known and needs no elaboration.

Further, with welding machines where the welding electrodes are located a relatively great distance from the welding transformer, as where the electrode supporting arms are very long, the circuit from the welding transformer through the electrodes and back has a high inductive reactance when the current is supplied to the welding transformer at the commercial frequency, i.e., 60-cycle, alternating current. Thus, the energy delivered at the welding electrodes may be only a small fraction of that supplied to the welding transformer, due to the interference with the passage of the welding energy created by said inductive reactance.

Workers in this field have recognized these problems and have devised a variety of circuits for supplying energy from a poly-phase supply circuit to a single phase load circuit by drawing upon all phases of the supply circuit to balance the load thereon, and for supplying the energy to the load circuit at a lower frequency to reduce the inductive reactance thereof. Such circuits normally use rectifiers and commonly deliver a series of current impulses to the primary winding of a welding transformer, each impulse including a series of half-cycles of the same polarity from the supply circuit and each impulse being opposite in polarity to the one immediately preceding it to thereby provide a form of alternating current to the welding transformer.

It is necessary to provide a time period between the passing of a pulse of one polarity to the winding transformer and the passing of a pulse of opposite polarity, in order to allow the flux in the welding transformer to decay. This time period in low frequency welding is commonly referred to as the "interpulse time." In high speed welding operations, the interpulse time should be as short as possible. The prior circuits for effecting frequency conversion have not been completely satisfactory in this respect. These circuits, in general, provide control circuits to turn on and turn off the rectifiers at fixed times with respect to one particular phase of the three phase power supply. In particular, the rectifiers usually can be turned on only at the beginning of a half-cycle of only one of the phases. However, complete decay of the flux in the transformer may, and usually does, occur before the beginning of a half-cycle of the particular phase, so that an appreciable amount of time is lost in waiting for the right phase to reach the beginning of its next half-cycle before the rectifiers can again be turned on.

Accordingly, it is a principal object of this invention to provide an improved process for frequency conversion, in which the interpulse time may be materially less than in present practice.

It is a further object of this invention to provide an improved circuit, as aforesaid, in which the timing of the rectifiers is performed independently of the condition of any particular phase of the poly-phase supply circuit.

It is a further object of this invention to provide an improved circuit for intermittently and alternately supplying pulses of opposite polarity to a transformer from a poly-phase supply circuit, in which the time period between the application of successive pulses may be held to the minimum necessary for permitting complete decay of the flux in the transformer.

It is a further object of this invention to provide a process, as aforesaid, for converting three phase, 60-cycle, alternating current into single phase, low frequency current, wherein the rectifiers controlling application of an impulse of one polarity may be turned on 1/360 second or multiples thereof after decay of the flux in the transformer is complete.

It is a further object of this invention to provide an improved circuit, as aforesaid, in which the timing function is performed by counting pulses from the poly-phase source, the time intervals between pulses being equal to each other.

It is a further object of this invention to provide an improved circuit for converting commercial, three-phase, 60-cycle, alternating current into single phase, low frequency, alternating current, as aforesaid, in which the pulses from the three phase source occur 1/360 second apart.

Other objects and advantages of this invention will become apparent to those acquainted with this art upon reading the following description and inspecting the accompanying drawings, in which.

*General description*

In general, this invention provides a process and circuit for supplying single phase, low frequency, alternating current to a load transformer from a relatively high frequency, poly-phase, alternating current source, wherein the current from said source is rectified and power pulses of opposite polarity are successively delivered to the primary winding of the transformer, the power pulses being delivered at timed intervals to permit decay of the flux within the transformer during the intervals. As thus far stated, this invention uses what is known in the prior art. In addition, however, this invention relates to a process and circuit for controlling the interpulse time, which includes applying counting pulses from the alternating current source to a counter, counting said pulses, and effecting a turning on and turning off of the rectifiers at predetermined times, such that at the end of a predetermined number of counting pulses the delivery of a power pulse of one polarity to the transformer is terminated, following which there is a delay during which no energy is transmitted to the transformer, and at the end of a further predetermined number of counting pulses the delivery of a power pulse of opposite polarity to said transformer is initiated.

Detailed description

Figure 1:
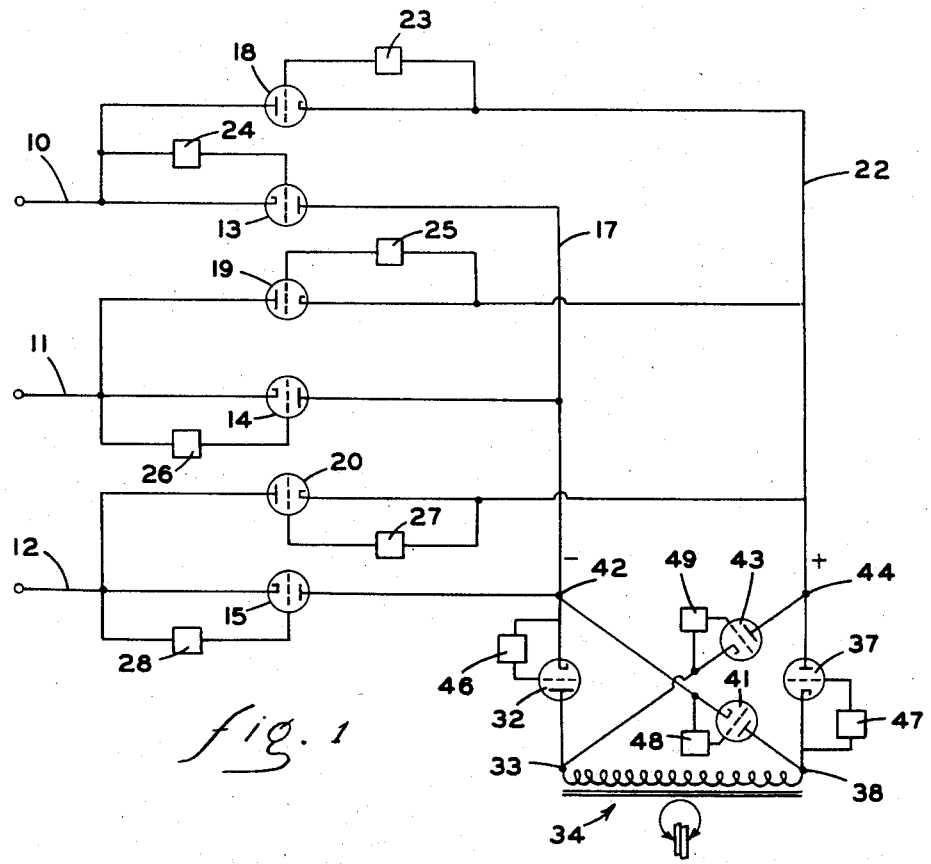
Figure 1 is a circuit diagram, showing a rectifier circuit for supplying pulses of opposite polarity to a primary winding of a welding transformer.

Referring to Figure 1, the supply circuit includes line conductors 10, 11 and 12 for carrying the respective phases of a three phase supply, such as a 60-cycle, alternating current supply. The line conductors 10, 11 and 12 are respectively connected to the cathodes of grid controlled rectifiers 13, 14 and 15, the anodes of said rectifiers being connected to a conductor 17. The line conductors 10, 11 and 12 are also connected to the anodes of grid controlled rectifiers 18, 19 and 20, respectively. The cathodes of rectifiers 18, 19 and 20 are connected to a conductor 22. Control circuits, schematically shown at 23, 24, 25, 26, 27 and 28, are connected to the rectifiers 18, 13, 19, 14, 20 and 15, respectively between the control grids and the cathodes thereof. The particular details of these control circuits form no part of the present invention, since their function can be performed by a variety of different circuits.

Conductor 17 is connected to the cathode of a first switching tube 32, whose anode is connected to one terminal 33 of the primary winding of the welding transformer 34. Conductor 22 is connected to the anode of a second switching tube 37, whose cathode is connected to the other terminal 38 of the primary winding of said welding transformer 34. The cathode of a third switching tube 41 is connected to a junction point 42 on conductor 17, and its anode is connected to the terminal 38 of the primary winding of said transformer 34. The anode of a fourth switching tube 43 is connected to a junction point 44 on conductor 22, and its anode is connected to terminal 33 of the primary winding of said welding transformer 34.

Control circuits 46, 47, 48 and 49 are connected to the switching tubes 32, 37, 41 and 43, respectively, between the control grids and the cathodes thereof.

In operation, the switching tubes 32 and 37 will operate together to transmit a power pulse consisting of a series of half-cycles of one polarity through the winding of the transformer 34, tubes 41 and 43 will operate together to transmit a power pulse consisting of a series of half-cycles of the same polarity in the opposite direction through the primary winding of said transformer 34. Tubes 32 and 37 and tubes 41 and 43 will operate alternately to supply a form of alternating current to the primary winding of transformer 34.

The circuit thus far recited, with the exception of the control circuits for the respective rectifiers and switching tubes, is substantially the same as that disclosed in Archiv fur Elektrotechnik 1933, Volume II, pages 222, 223 and 224. Hence, no claim of novelty is made with respect to it except as regards the use of the control circuits for the rectifiers and switching tubes and the operation of these control circuits by the circuit about to be described.

It has been found desirable to operate the above described circuit in the following manner:

(1) Turn on the rectifiers and conduct through one set of switching tubes to the welding transformer.

(2) Turn off the rectifiers to terminate flow of energy to the welding transformer.

(3) After an interval of interpulse time the first set of switching tubes will be turned off and the other set of switching tubes will be turned on and the rectifiers will be turned on again.

(4) After a further predetermined period of time, the rectifiers will be turned off.

This is the series of steps performed in completing one cycle of low frequency current supplied to the welding transformer and, obviously, may be repeated as often as necessary or desired.

In order to provide an improved method and circuit for controlling the time intervals of the sequence of steps described above, recognition has been made of the fact that, with an X-cycle per second, $n$ phase, alternating current, there are $2Xn$ half-waves per second, which when suitable rectified, will provide $2Xn$ pulses per second which can be utilized as counting pulses, and that each such pulse is spaced an equal interval of time with respect to the other corresponding pulses. With commercial 60-cycle, three phase, alternating current, there will be 360 half-waves per second. Thus, by controlling the operation of the rectifiers and switching tubes in response to actuation from all phases of the power supply, and using a timing function, which includes a large number, e.g., 360, of counting pulses per second, it will be possible to closely control the respective timing intervals for maximum welding efficiency and speed.

Figure 2:
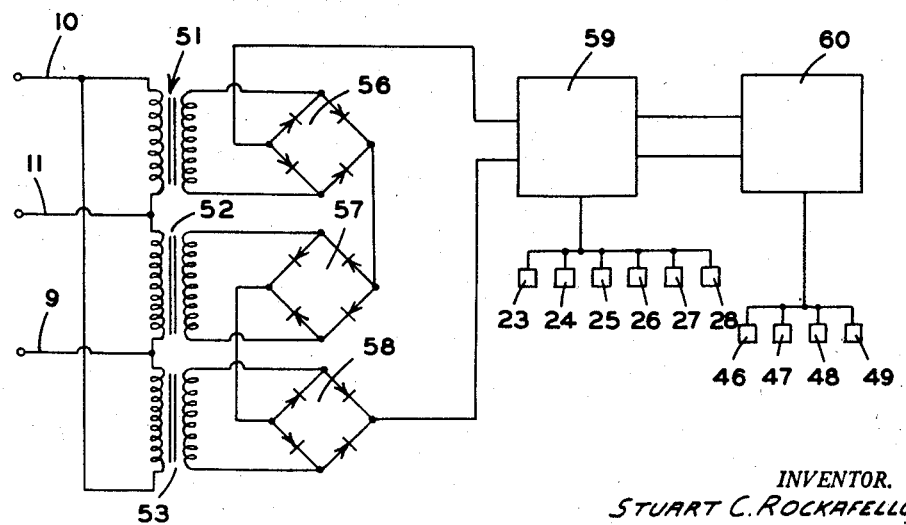
Figure 2 is a circuit diagram, showing a control circuit for effecting control of the operation of the rectifier circuit by counting pulses from the three phase supply.

Referring to Figure 2, there is shown one representative circuit for supplying a single phase, pulsed A.C. circuit from a poly-phase, A.C. supply. It will be apparent that a wide variety of circuits can be utilized for performing the same function and such circuits are included within the scope of this invention. The line conductors 9, 10 and 11 carry the respective phases of the three phase power supply and are connected to the primary winding of current impulse transformers 51, 52 and 53. The secondary windings of the respective transformers are connected to bridge circuits 56, 57 and 58. The outputs from the bridge circuits are combined and are fed to a first counter 59, and thence to a second counter 60. The outputs of the counters are connected to the control circuits 23, 24, 25, 26, 27 and 28 for the rectifiers and to the control circuits 46, 47, 48 and 49 for the switching tubes. The counters 59 and 60 may be of any suitable type and will ordinarily be of the electronic type of counter. This type of counter will be caused to count at the peak of each of the half-cycles, or counting pulses, transmitted by the combined bridge circuits and will count a predetermined number of such pulses. When that count is reached, the counter will cause conduction of a tube so that switching, blocking or other functions may be performed as soon as the predetermined count is achieved. The first counter 59 will time both the negative and positive half-cycles through the transformer and the counter 60 will be used to time the interpulse time. Further, the timer 60 may be used to time the cool time if the machine is to be used for an alternate, half-cycle, seam welder.

Operation

Figure 3:
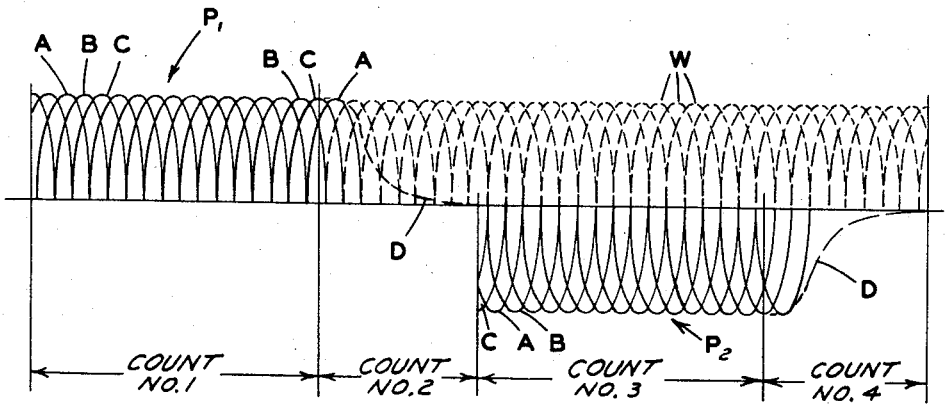
Figure 3 is a view showing in solid lines the input to the transformer and showing in broken lines the counting pulses for a single cycle of operation of the invention.

While the operation of the circuits has been given during the preceding description, it will be briefly summarized for purposes of completeness. The rectifiers 13, 14, 15, 18, 19 and 20 will effect a full wave rectification of each of the phases of the three phase power supply. The outputs therefrom will be fed through conductors 17 and 22 to the switching tube arrangement. With switching tubes 32 and 37 conducting, positive power pulses will pass from terminal 38 to terminal 33 of the primary winding of the welding transformer 34. When tubes 43 and 41 are conducting, the positive power pulses will pass from terminal 33 to terminal 38 of said welding transformer 34. Thus, successive power pulses of the same polarity will be fed through the welding transformer in opposite directions, each pulse consisting of a series of half-cycles of the alternating current supply, to provide a form of alternating current. It will be understood that the output from the combined bridge circuits will be D.C. including a series of half-cycles W of the same polarity as shown in broken lines in Figure 3. The power pulses P₁ and P₂ to the transformer are shown in solid lines in Figure 3, each of said pulses consisting of a series of half cycles of the respective phases A, B and C.

The counters 59 and 60 will be preset to be pulsed at the peak of each of the half-cycles W and will count a predetermined number of such peaks of the half-cycles or counting pulses W and then will actuate the control circuits for the respective rectifiers and tubes. Thus, the outputs from the bridge circuits 56, 57 and 58, when using commercial three phase, 60-cycle, alternating current power supply, will consist of 360 pulses W per second which will be fed to the counter 59. The counter 59 will turn on the rectifiers at the beginning of the No. 1 counting operation as above defined. As soon as the predetermined number of counting pulses W have pulsed the counter 59, the No. 1 counting operation will end and the rectifiers will be turned off. Thereupon, counter 60 will begin to receive counting pulses from the bridge circuits for the No. 2 counting operation. The counter 59 will reset itself for the subsequent timing operation. Power pulse P₁ will not terminate immediately upon turning off the rectifiers since the half-cycles which have already started will be carried to completion. Timer 60 will time out at the end of a further number of counting pulses, which measure the interpulse time. During this time, the flux in the transformer will decay, somewhat as indicated by line D. At the end of the No. 2 counting operation timer 60 will switch the switching tubes to permit a pulse of opposite polarity to travel through the welding transformer. Counting pulses will then be fed to counter 59 which will turn on the rectifiers and count a further number of counting pulses during the No. 3 counting operation. At the end of the No. 3 counting operation the rectifiers will be turned off and the counter 60 will be actuated for the No. 4 counting operation to control the interpulse time.

It will be noted that the timing operation, particularly for controlling the interpulse time, is independent of any particular phase of the three phase power supply and can begin or end during any phase. Thus, it is not necessary to wait for the beginning of a particular phase before beginning the application of a pulse of opposite polarity to the welding transformer after the flux is decayed. It is possible, and is a common manner of operating this control, to start the application of the pulse of opposite polarity 1/360 second after the flux has decayed. The control circuits 23, 24, 25, 26, 27 and 28 for the rectifiers are all operated simultaneously and may be provided with a phase shift circuit for controlling the outputs of the respective rectifiers. It has been found desirable to control each of the rectifiers, rather than attempting to control only three of them, in order to obtain more uniform and effective operation.

Modification

Figure 4:
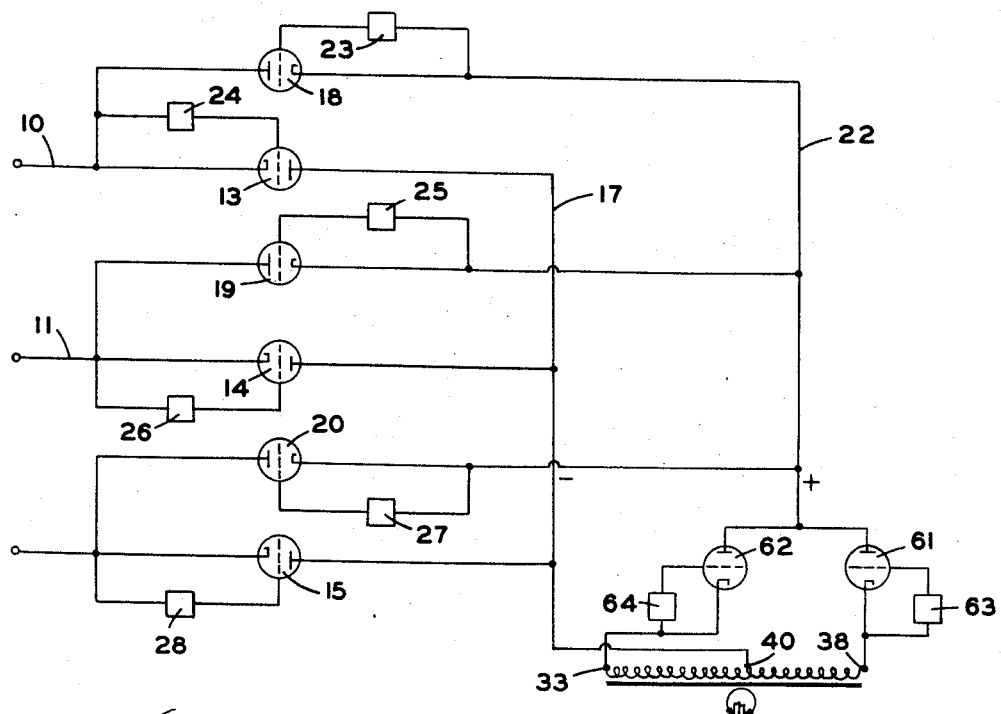
Figure 4 is a circuit diagram of a modification of the circuit of Figure 1.

In Figure 4 there is shown a modification of the circuit of Figure 1 which eliminates two of the switching tubes. Elements which are identical in the two figures are numbered the same and further discussion thereof is believed unnecessary. Conductor 17 is connected to a center tap 40 on the primary winding of transformer 34. Conductor 22 is connected to the anodes of tubes 61 and 62. The cathodes of tubes 61 and 62 are connected to the terminals 38 and 33 of the primary winding of transformer 34. When tube 61 is conducting, positive half-waves from conductor 22 pass from terminal 38 through center tap 40 to conductor 17. When tube 62 conducts, positive half-waves from conductor 22 pass from terminal 33 through center tap 40 to conductor 17. Control circuits 63 and 64 are connected between the control grids and cathodes of tubes 61 and 62, respectively. These control circuits are controlled in the same manner as previously described with respect to Figures 1 and 2. The circuit of Figure 4 provides a somewhat different manner of creating a low frequency alternating current in transformer 34 but otherwise is operated in the same manner as the previously described embodiment.

While embodiments of the invention are shown herein for illustrative purposes, it will be appreciated that the invention is capable of wide application in a variety of situations other than the situations particularly, although schematically, illustrated herein. Accordingly, the hereinafter appended claims are to be interpreted as applicable to said variety of other applications, except as said claims may by their own terms expressly require otherwise.

I claim:

1. In a process for supplying single phase, low frequency, alternating current from a relatively high frequency, poly-phase, alternating current source to a load transformer, which includes the steps of rectifying the current from said source and successively delivering pulses of said current of opposite polarity to the primary winding of said transformer, the pulses being delivered at timed intervals to permit decay of the flux within the transformer during the intervals, the improvement in said process which comprises the steps of: supplying pulses from all of the phases of said source to a counter, said pulses being apart by equal increments of time; counting said pulses and, at the end of a predetermined number of pulses in which the final one of said pulses may be derived from any of the phases of said source, terminating the delivery of a current pulse of one polarity to said transformer; continuing to count said pulses and, at the end of a further predetermined number of pulses in which the final one of said pulses may be derived from any of the phases of said source, initiating the delivery of a current pulse of opposite polarity to said transformer the delivery of said last-mentioned current pulse being initiated from any selected phase of said source.

2. In a process for supplying single phase, low frequency current from a three phase, 60-cycle, alternating current source, which includes the steps of rectifying the current from said source and successively delivering power pulses of said current of opposite polarity to the primary winding of said transformer, the pulses being delivered at timed intervals to permit decay of the flux within the transformer during the intervals, the improvement in said process which comprises the steps of: supplying counting pulses from said source to a counting circuit at the rate of 360 pulses per second, said counting pulses being equally spaced in time; counting said pulses and, at the end of a predetermined number of counting pulses in which the final one of said pulses may be derived from any of the phases of said source, terminating the supplying of the power pulses to said primary winding; counting a further number of said counting pulses and, at the end of a further number of counting pulses in which the final one of said pulses may be derived from any of the phases of said source, initiating the delivery of a pulse of opposite polarity to said primary winding, the delivery of said last-mentioned current pulse being initiated on the selected phase of said source immediately following the decay of the flux within the transformer.

3. In a circuit for supplying single phase, low frequency, alternating current from a relatively high frequency, poly-phase, alternating current source to a load transformer, including a series of rectifiers for rectifying the current supplied by the respective phases of said source and switches for controlling the application of the rectified current to the primary winding of the load transformer, the improvement in said circuit, which includes: a control circuit for each of said rectifiers for controlling the operation thereof; means controlling the operation of said switches; means for supplying a series of pulses from each of the phases of said source, said pulses being spaced at equal intervals of time; counting means for counting said pulses; and means responsive to said counting means for actuating said control circuits and the control means for said switches.

4. In a circuit for supplying single phase, low frequency, alternating current from a multi-phase alternating current source to a load transformer, including a pair of rectifiers for each of said phases for rectifying alternate half-cycles from each phase and switches for controlling the application of rectified current to the primary winding of said load transformer; the improvement in said circuit, which includes: a control circuit for each of said rectifiers for controlling the operation thereof; means controlling the operation of said switches; means for supplying 2X$n$ counting pulses per second from said source where "X" equals the number of cycles per second of the source and "$n$" equals the number of phases of the source; a pair of counting means connected for receiving said counting pulses; means connecting one of said counting means to the control circuits for said rectifiers for controlling the operation thereof; means connecting the other of said counting means to said control means for said switches for controlling the operation thereof and means connecting the counting means together so that said counting means operate sequentially.

5. In a circuit for supplying single phase, low frequency, alternating current from a 60-cycle, three phase, alternating current source to a load transformer, including a pair of rectifiers for each of said phases for rectifying alternate half-cycles from each phase and switches for controlling the application of rectified current to the primary winding of said load transformer; the improvement in said circuit, which includes: a control circuit for each of said rectifiers for controlling the operation thereof; means controlling the operation of said switches; means for supplying 360 counting pulses per second from said source; a pair of counting means connected for receiving said counting pulses; means connecting one of said counting means to the control circuits for said rectifiers for controlling the operation thereof; means connecting the other of said counting means to said control means for said switches for controlling the operation thereof.

6. A circuit for supplying to a load transformer single phase, low frequency, alternating current from a relatively high frequency, polyphase alternating current source, comprising: a pair of rectifiers for each of the phases of said source for rectifying alternate half cycles from each phase; a control circuit for each of said rectifiers for turning on and turning off said rectifiers; switches for controlling the direction of flow of the rectified current through the primary winding of said load transformer; means for supplying a series of pulses from each of the phases of said source, said pulses being equally spaced and being equal in number to twice the product of the number of the cycles per second of said source multiplied by the number of phases of said source; means for counting said pulses; and means responsive to said counting means for turning on said rectifiers and actuating said switches to direct rectified current through the primary winding of said load transformer in one direction, said last mentioned means turning off said rectifiers after a predetermined number of pulses and after a further number of pulses reversing said switches and turning on said rectifiers to direct rectified current through the primary winding of said load transformer in the opposite direction, said last-mentioned means turning off said rectifiers after a further number of pulses.

7. In a circuit for supplying single phase, low frequency, alternating current from a relatively high frequency, polyphase, alternating current source to a load transformer, including a series of rectifiers for rectifying the current supplied by the respective phases of said source and switches for controlling the application of rectified current to the primary winding of the load transformer, the improvement in said circuit which includes: control means for said rectifiers for controlling the conductivity thereof; control means for controlling the operation of said switches; means for supplying a series of pulses derived from each of the phases of said source; counting means for counting said pulses; and means responsive to said counting means for actuating said control means for said rectifiers and said control means for said switches.

References Cited in the file of this patent

UNITED STATES PATENTS

| | | |
|---|---|---|
| 2,319,524 | Undy | May 18, 1943 |
| 2,431,262 | Longini | Nov. 18, 1947 |
| 2,614,240 | Bivens | Oct. 14, 1952 |
| 2,721,302 | Bivens et al. | Oct. 18, 1955 |